United States Patent
Aharoni et al.

(10) Patent No.: US 10,438,121 B2
(45) Date of Patent: Oct. 8, 2019

(54) AUTOMATIC CONSTRUCTION OF ARGUMENTS

(71) Applicant: International Business Machines Corporation, Armonk, NY (US)

(72) Inventors: Ehud Aharoni, Kfar Saba (IL); Dan Gutfreund, Raanana (IL); Daniel Hershcovich, Givat Ela (IL); Tamar Lavee, Tel Aviv (IL); Ran Levy, Givatayim (IL); Ruty Rinott, Jerusalem (IL); Noam Slonim, Jerusalem (IL); David Carmel, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1095 days.

(21) Appl. No.: 14/265,408

(22) Filed: Apr. 30, 2014

(65) Prior Publication Data

US 2015/0317560 A1 Nov. 5, 2015

(51) Int. Cl.
*G06N 5/04* (2006.01)
*G06N 20/00* (2019.01)

(52) U.S. Cl.
CPC .............. *G06N 5/04* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 5,995,728 A | 11/1999 | Forman | |
| 8,438,054 B2 | 5/2013 | Lowrance et al. | |
| 2004/0161734 A1* | 8/2004 | Knutson | G09B 5/00 434/335 |
| 2005/0131935 A1* | 6/2005 | O'Leary | G06F 17/30616 |
| 2008/0040137 A1 | 2/2008 | Lee et al. | |
| 2009/0119234 A1 | 5/2009 | Pinckney et al. | |
| 2009/0228478 A1 | 9/2009 | Steichen | |
| 2010/0306157 A1* | 12/2010 | Onuchin | G06Q 30/02 706/50 |

OTHER PUBLICATIONS

IP.com, "Method of persuasion with automated, universally correct statements", an IP.com Prior Art Database Technical Disclosure, Disclosed Anonymously, Oct. 13, 2013.

* cited by examiner

*Primary Examiner* — Kakali Chaki
*Assistant Examiner* — Michael Zidanic
(74) *Attorney, Agent, or Firm* — Dvir Gassner

(57) ABSTRACT

A method comprising using at least one hardware processor for receiving a topic under consideration (TUC); providing the TUC as input to a claim function, wherein the claim function is configured to mine at least one content resource, and applying the claim function to the at least one content resource, to extract claims with respect to the TUC; and providing the TUC as input to a classification function, and applying the classification function to one or more claims of the extracted claims, to output corresponding one or more classification tags, wherein each classification tag is associated with its corresponding claim.

15 Claims, 3 Drawing Sheets

AUTOMATIC CONSTRUCTION OF ARGUMENTS

BACKGROUND

The present invention relates to the field of data analysis.

A basic task that people engage in on a daily basis is to provide claims with respect to some topic and support these claims. For example, people may require claims to persuade others. Persuading can either takes the form of influencing someone to take your point of view, agreeing to your opinion, performing a certain task and so forth. Examples can come from various domains such as law, politics, marketing, financial and business advising, IP protection, etc. In such scenarios, people are required to provide convincing claims (and counter claims) in order to persuade the other side.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment provides A method comprising using at least one hardware processor for receiving a Topic Under Consideration (TUC); providing the TUC as input to a claim function, wherein the claim function is configured to mine at least one content resource, and applying the claim function to the at least one content resource, to extract claims with respect to the TUC; and providing the TUC as input to a classification function, and applying the classification function to one or more claims of the extracted claims, to output corresponding one or more classification tags, wherein each classification tag is associated with its corresponding claim.

A further embodiment provides a computer program product comprising a non-transitory computer-readable storage medium having program code embodied therewith, the program code executable by at least one hardware processor to receive a Topic Under Consideration (TUC); provide the TUC as input to a claim function, wherein the claim function is configured to mine at least one content resource, and applying the claim function to the at least one content resource, to extract claims with respect to the TUC; and provide the TUC as input to a classification function, and applying the classification function to one or more claims of the extracted claims, to output corresponding one or more classification tags, wherein each classification tag is associated with its corresponding claim.

In some embodiments, the method further comprises using said at least one hardware processor for providing a claim of the one or more claims as input to an evidence function, wherein the evidence function is configured to mine at least one content resource, and applying the evidence function to the content resource, to extract evidence supporting and associated with the claim. [Dan: see question in the specification above].

In some embodiments, each of the extracted claims is associated with a claim score, each of the outputted classification tags is associated with a classification score, and each piece of evidence of the extracted evidence is associated with an evidence score, and wherein the at least one hardware processor is further used for calculating a fused score for each of the one or more claims based on its associated claim score, classification score and evidence scores.

In some embodiments, the method further comprises using said at least one hardware processor for generating a list of arguments comprising a plurality of arguments, wherein each argument of the plurality of arguments comprises: one different claim of the one or more claims, evidence which is associated with the one different claim, and a classification tag of the classification tags associated with the one different claim.

In some embodiments, the method further comprises using said at least one hardware processor for displaying the list of arguments.

In some embodiments, the displaying of the list of arguments further comprises ordering the list of arguments according to the fused scores of the one or more claims corresponding to the arguments.

In some embodiments, the method further comprises using said at least one hardware processor for determining weights, wherein the determining of the weights comprises: determining a claim weight for the claim scores, determining an evidence weight for the evidence scores, determining a classification weight for the classification scores, and wherein the calculating of the fused score is further based on the determined weights.

In some embodiments, the method further comprises using said at least one hardware processor for refining at least one argument of the plurality of arguments.

In some embodiments, the method further comprises using said at least one hardware processor for phrasing at least one argument of the plurality of arguments.

In some embodiments, the applying of the classification function to the one or more claims comprises classifying each of the one or more claims as a pro claim or a con claim with respect to the TUC.

Another embodiment provides a method comprising using at least one hardware processor for generating a claim training dataset comprising a first content item and multiple claims, each of the multiple claims being with respect to a topic of a plurality of topics, wherein the claims are selected from the first content item by a first group of people; generating a classification training dataset comprising a classification of each claim of the multiple claims with respect to its corresponding topic, wherein the classification is performed by a second group of people; learning a claim function for extracting claims from a provided content item, with respect to a provided topic, wherein the learning is based on the claim training dataset; and learning a classification function for classifying a provided claim with respect to a provided topic, wherein the learning is based on the classification training dataset.

In some embodiments, the method further comprises using said at least one hardware processor for generating an evidence training dataset comprising a second content item and evidence, the evidence being supportive of the multiple claims, wherein the evidence is selected from the second content item by a third group of people; and learning an evidence function for extracting evidence from a provided content item, supporting a provided claim, based on the evidence training set.

In some embodiments, the first and second content items may include content selected from the group consisting of: textual content, image content, audio content, video content or a combination thereof.

In some embodiments, the classification comprises classifying each claim of the multiple claims as a pro claim or a con claim with respect to its corresponding topic.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
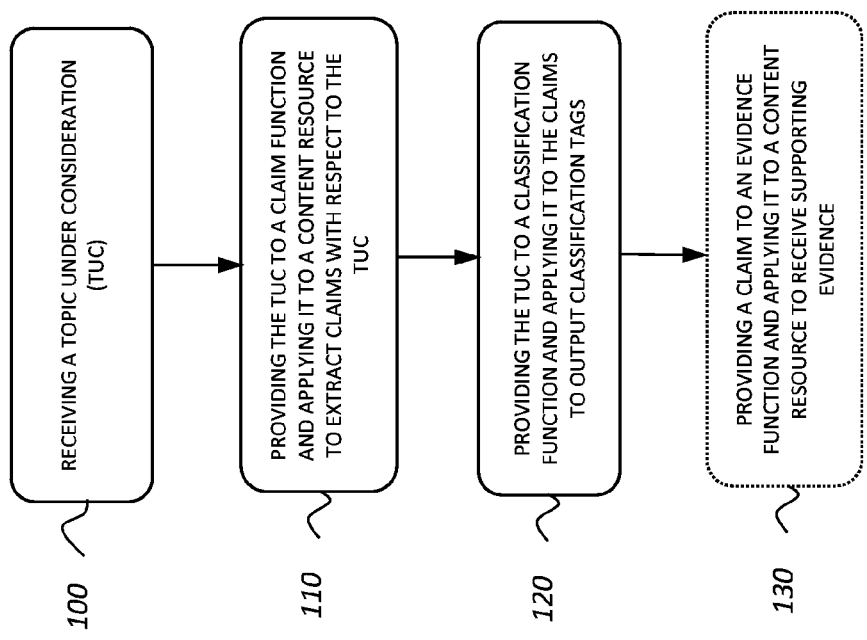
FIG. 1 shows a flowchart of a method, constructed and operative in accordance with an embodiment of the disclosed technique.

Methods and computer program products are disclosed herein that may automatically construct (i.e., without human intervention) a list of relevant claims and supportive evidence given a topic under consideration (TUC). Thus, for example, one may extract persuasive claims supporting his or her point of view as well as be prepared for counter claims which the other side may raise while discussing the TUC.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
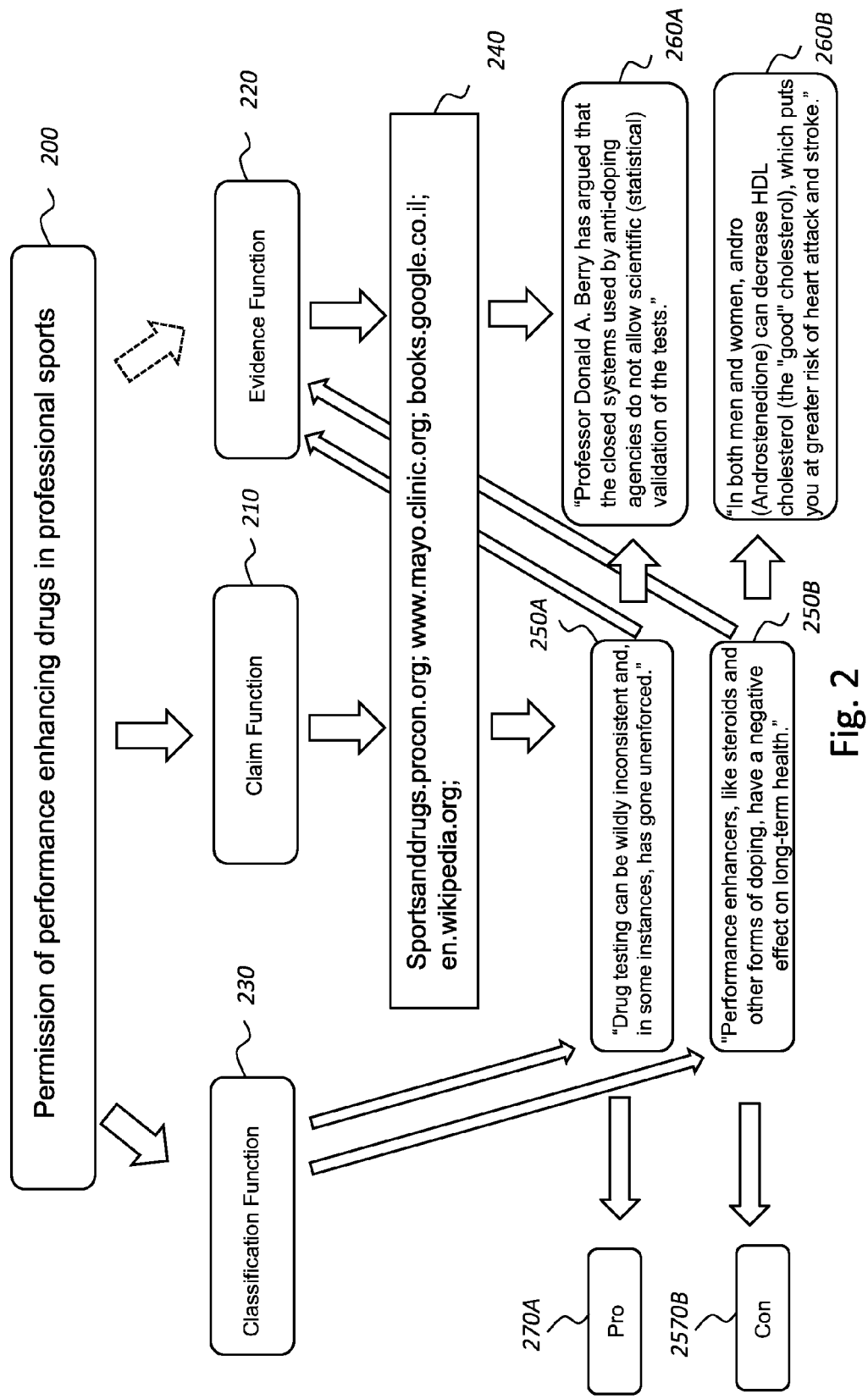
FIG. 2 shows a diagram exemplifying the operation of the method of FIG. 1.

Reference is now made to FIG. 1 and FIG. 2. FIG. 1 shows a flowchart of a method, constructed and operative in accordance with an embodiment of the disclosed technique. FIG. 2 shows a diagram exemplifying the operation of the method of FIG. 1. In a step 100, a topic under consideration (TUC) may be received. The TUC may be a debatable topic in a free text format. The TUC may be received, for example, from a user of the method. With reference to FIG. 2, an exemplary TUC 200, namely "Permission of performance enhancing drugs in professional sports", may be received from a user.

In a step 110, the TUC may be provided as input to a claim function. The claim function may be configured to mine at least one content resource. The claim function may then be applied to the at least one content resource, to extract claims with respect to the TUC. The claim function may be generated according to the method of FIG. 3. The claim function may, for example, be configured to mine Wikipedia unstructured text documents, the archive of the New York Times or the abstracts in PubMed. Links to the one or more content resources, such as uniform resource locators (URLs), may be embedded in the claim function or may be provided to the claim function as input. The claim function may then automatically retrieve textual passages (e.g., sentences, paragraphs, articles or full documents) from the one or more resources with respect to the provided TUC. The textual passages may be retrieved by utilizing known technique from the area of information retrieval, such as techniques used for web search, in particular indexing, which may allow fast search over vast amount of documents. The claim function may extract claims relevant to the TUC within the retrieved textual passages. An extracted claim may be a concise statement with respect to the TUC. For example, a claim may directly support or contests the TUC. Optionally, a claim function may be configured to mine a certain type of content resource, e.g., news sites.

A content resource according to the disclosed technique may include numerous content items. A content resource may be, for example, an online encyclopedia such as Wikipedia, an online magazine, an institutional internet site, an archive such as a news archive, a blog archive, a legal-related archive, a science-related archive, a search engine, a database and more. The content may include text, images, audio, video, etc. Optionally, the TUC may be provided to multiple claim functions which may be configured (altogether) to mine multiple content resources. Multiple content resources may allow access to large and diverse content.

With reference to FIG. 2, TUC 200 may be provided to an exemplary claim function 210. Claim function 210 may be configured to mine content resources 240, which may include, as an example, Wikipedia, ProCon.org organization site, Mayo Clinic organization site and Google books search engine. Claim function 210 may be applied to content resources 240 and extract two claims: claim 250A and claim 250B, both with respect to TUC 200.

In a step 120, the TUC may be provided as input to a classification function. The classification function may be then applied to one or more claims of the extracted claims to receive classification of these claims according to a predefined classification. The classification function may output one or more classification tags corresponding to the one or more claims. Each classification tag may be associated with its corresponding claim. Each classification tag may include the classification of its corresponding claim. The classification function may be generated according to the method of FIG. 3. For example, the claims may be classified as a pro claim or a con claim with respect to the TUC and/or the claims may be classified as a "moral claim" or a "factual claim".

With reference to FIG. 2, TUC 200 may be provided as input to a classification function 230. Classification function 230 may be applied to claim 250A and claim 250B. Classification function 230 may classify claim 250A and claim 250B to a Pro or Con claim with respect to TUC 200. Claim 250A recites: "Drug testing can be wildly inconsistent and, in some instances, has gone unenforced." and therefore may be associated with a classification tag 270A which classifies claim 250A as Pro. Claim 250B recites: "Performance enhancers, like steroids and other forms of doping, have a negative effect on long-term health." and therefore may be associated with a classification tag 270B which classifies claim 250B as Con.

In an optional step 130, a claim of the one or more claims may be provided as input to an evidence function. The evidence function may be configured to mine at least one content resource. The evidence function may be then applied to the content resource, to extract evidence supporting the claim and associated with it. Evidence may be extracted for each claim of the one or more claims. Each piece of evidence of the extracted evidence may support and may be correspondingly associated with at least one claim. The evidence may include consecutive text segments of different types that directly support the claims, relevant and supportive images, audio files, and/or video files. The evidence function may retrieve textual passages (e.g., sentences, paragraphs, articles and/or full documents) from the at least one content resource. Appropriate content that with high probability may include evidence that support a claim in the context of the TUC may be retrieved by utilizing known information retrieval techniques, such as techniques used for web search, in particular indexing. Optionally, the evidence function may include various components adapted to retrieve various types of evidence, such as study, expert opinion, anecdotal story etc. Various types of evidence may potentially have different statistical signatures For example in an evidence of type study one may expect to find numbers, percentages etc. as opposed to anecdotal story which may contain emotional words and may be longer in general. For example, text segment that refers to the results of a scientific quantitative study (type "study"), as opposed to a text segment that mentions a relevant anecdotal story (type "anecdotal"). The evidence function may then detect consecutive text segments that represent a piece of evidence for a provided claim in the context of the TUC within the retrieved textual passages. Optionally, the evidence function may further identify the text segments type of evidence. Additional supportive evidence may be extracted by the evidence function based on the retrieved consecutive text segments in the form of text (e.g., quotes), images, audio, and/or video etc. Advantageously, evidence extracted for a provided claim may be used in classifying the claim according to step 120. For example, evidence may include sentimental words and/or expressions which may help identify whether a claim is pro or con the TUC. Optionally, the TUC may be also provided as input to the evidence function in order to support evidence extraction.

With reference to FIG. 2, claim 250A may be provided to evidence function 220. Evidence function 220 may be then applied to content resources 240. A piece of evidence 260A, which supports claim 250A, may be extracted from content resources 240 and associated with claim 250A. Claim 250B may be also provided to evidence function 220. Evidence function 220 may be then applied to content resources 240. A piece of evidence 260B, which supports claim 250B, may be extracted from content resources 240 and associated with claim 250B.

In an optional step, calculation of a fused score for each of the one or more claims may be performed. Each of the extracted claims may be associated with a claim score. Each of the outputted classification tags may be associated with a classification score, and each of the extracted pieces of evidence may be associated with an evidence score. The scores may be outputted by the functions correspondingly (i.e., claim functions, evidence functions and classification functions) by utilizing known machine learning techniques such as Naïve Bayse, logistic regression and/or SVM. The scores may reflect the confidence level of the functions at the outputted results. For example, a score may indicate how much a claim or evidence function is confident that an outputted claim or piece of evidence is indeed a claim or evidence correspondingly. The scores may be calculated by known machine learning algorithms. Each claim may be associated with evidence and a classification tag. Therefore, each claim may be further associated with the evidence scores of the associated evidence and the classification score of the associated classification tag. Thus, the calculation of the fused score may be performed for each of the claims based on its associated claim score, classification score and evidence scores.

Optionally, weights for the scores may be determined. A claim weight may be determined for the claim scores and an evidence weight may be determined for the evidence scores. The weights may represent a quality score which indicates how effective a claim or evidence may be when arguing about the TUC. For example, evidence from the latest Nature publication may be better than evidence that appeared in some esoteric journal ten years before. Such weight determination may be performed by known machine learning algorithm Various features and statistics may be computed and then fed such as Naïve Bayse, logistic regression and/or SVM. The calculation of the fused score may then be further based on the determined weights. The determined fused score may quantitatively reflect the quality of a claim while considering the quality of its evidence as well. For example, the scores may reflect the persuasive power of a claim and/or associated evidence and/or the reliability of a claim and/or associated evidence.

In an optional step, a list of arguments may be generated. Each argument may include: a claim, evidence which is associated with the claim and a classification tag of the claim. Thus, each argument may be a tuple of <claim, evidence, classification>. Optionally, the list of arguments may be displayed to a user of the method. Optionally, the displayed list of arguments may be ordered according to the fused scores of the claims corresponding to the arguments (i.e., included in the arguments). The fused score of a claim may be then considered as the score of the argument including the claim. Thus, each argument may be a tuple of <claim, evidence, classification, argument score>. In some embodiments the argument may further include identifiers as for the evidence type. In some embodiments, the arguments may further include enriching elements such as images, video, audio, quotes or other texts relevant to the TUC which are not necessarily supporting evidence. For example, such enriching elements may provide further information with respect to events or location to which the claim relates.

In an optional step, refining of the claims and/or list of arguments may be performed. The refining may include discarding of redundant claims and/or arguments or of claims and/or arguments of less quality. For example, similar or equivalent claims and/or arguments may be discarded. Alternatively, similar or equivalent claims and/or arguments may be clustered (i.e., including argument's elements, such as evidence). A high-level analysis may be applied on the arguments (i.e., at this stage, candidate arguments) to improve the precision of the final output (e.g., the arguments list). For example, if for a candidate argument the output produced by the classification function was inconclusive (e.g., may be reflected by the classification score) and further the amount of automatically identified supporting evidence was relatively little (e.g., may be reflected by the evidence score), the candidate argument may be discarded. Such discarding may be performed on the basis of the argument score or any other score (i.e., claim score, evidence score, classification score and/or the fused score). For example, a threshold may be determined for the argument score such that each argument having an argument score which is lower may be discarded.

In an optional step, the extracted claims or the arguments in the list of arguments may be phrased. A claim and its supporting evidence, which may have been extracted from different texts and/or of different content resources, may be phrased together to receive a single argument properly phrased and ready to be delivered in natural language. The arguments may be presented in a specific human friendly interface that summarizes each argument while emphasizing its relationships to the provided TUC (i.e., its classification). A phrased version of the arguments in natural language may be generated and associated with the list of arguments. Time and/or length constraints may be provided for generating the phrased version. In some embodiments the list of arguments may be automatically phrased. In some embodiments, the phrased version may be suggested to a user of the method. The phrasing of a claim or an argument may be aimed to provide phrased versions that have a strong persuasive flavor, as reflected, for example, by high-quality claims or arguments generated by humans in similar circumstances. The phrasing may be performed by utilizing text summarization techniques as described, for example, in: Dipanjan Das and Andre F. T. Martins, "A Survey on Automatic Text Summarization", http://www.cs.cmu.edu/~afm/Home_files/

Das_Martins_survey_summarization.pdf, Jan. 29, 2014, which is hereby incorporated by reference in its entirety.

It should be noted that the functions described herein above may include one or more sets of instructions to be executed by a hardware processor, and may include sub-functions or multiple computer programs aimed to perform different operations.

Figure 3:
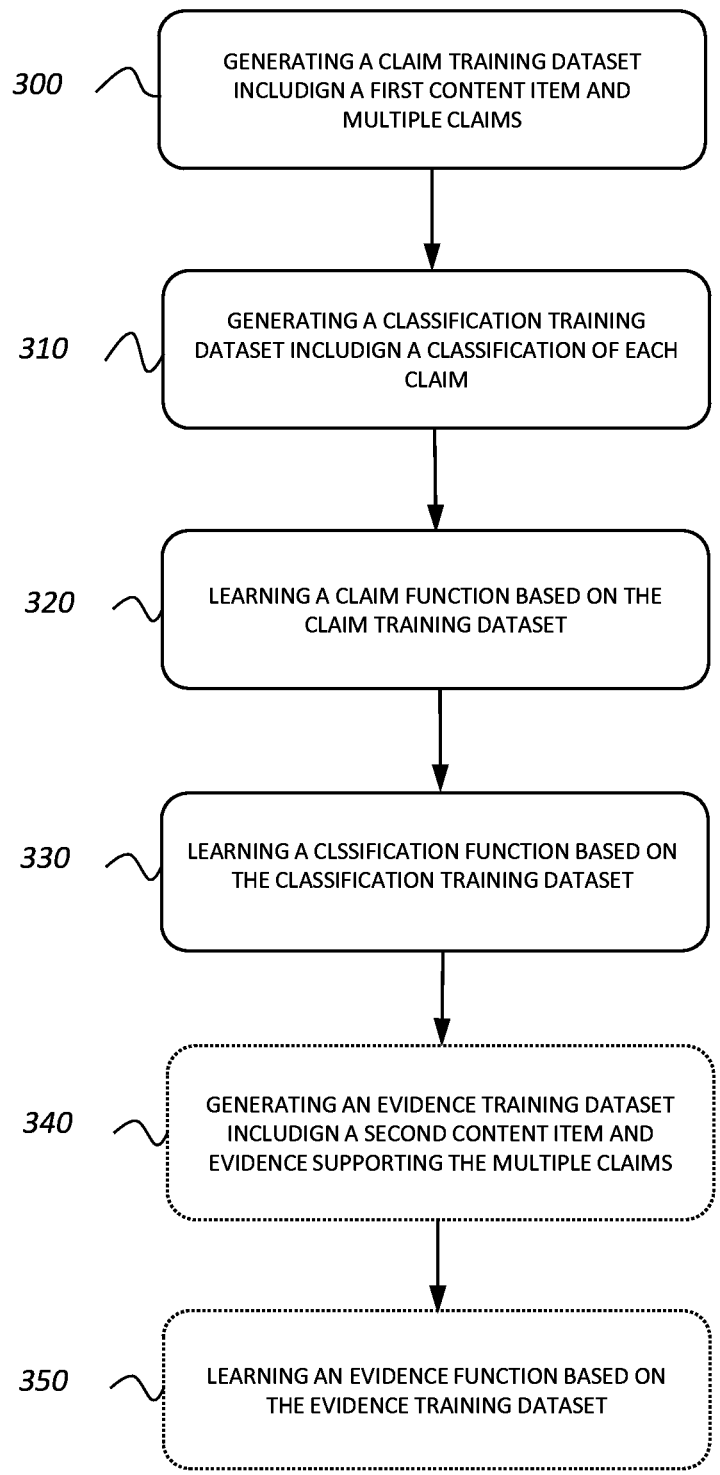
FIG. 3 shows a flowchart of a method, constructed and operative in accordance with another embodiment of the disclosed technique.

Reference is now made to FIG. 3, which shows a flowchart of a method, constructed and operative in accordance with another embodiment of the disclosed technique. In a step 300, a claim training dataset may be generated. The claim training dataset may include a first content item of a certain type (i.e., pertaining to certain one or more content resources) and multiple claims. Each of the multiple claims may be with respect to a topic of a plurality of topics. The claims may be selected from the first content item by a first group of people. A claim may be a concise statement with respect to a topic. For example, a claim may directly support or contests a topic. The claim training dataset may.

In a step 310, a classification training dataset may be generated. The classification training dataset may include a classification of each of the claims of the claim training dataset with respect to the claim's corresponding topic. The classification may be performed by a second group of people. The classification may include classifying each of the claims according to a predefined classification with respect to the claim's corresponding topic. For example, the claims may be classified as supporting a topic (Pro) or contesting it (Con), or they may be classified as statements or assumptions.

In a step 320, a claim function for extracting claims from a provided content item, with respect to a provided topic, may be learned. The learning may be based on the claim training dataset. The claim training dataset may be used to train the claim function by providing examples to extracting claims from a content item with respect to a provided topic. The claim function may be learned by applying well known machine learning techniques on the claim training dataset. Such machine learning techniques are described, for example, in: Tom Mitchell, "Machine Learning", McGraw Hill, 1997, which is hereby incorporated by reference in its entirety.

In a step 330, a classification function for classifying a provided claim with respect to a provided topic, may be learned. The learning may be based on the classification training dataset. The classification training dataset may be used to train the classification function by providing examples to classifying claims with respect to a provided topic and according to a predefined classification. The classification function may be learned by applying well known machine learning techniques, as described herein above in step 320 with respect to a claim function.

In an optional step 340, an evidence training dataset may be generated. The evidence training dataset may include a second content item and evidence of different types. The evidence may be supportive of the claims of the claim training dataset. The evidence may be selected from the second content item by a third group of people. The evidence may include consecutive text segments of different types that directly support the claims, relevant and supportive images, audio files, and/or video files.

In an optional step 350, an evidence function for extracting evidence from a provided content item, supporting a provided claim, may be learned. The learning may be based on the evidence training dataset. The evidence training dataset may be used to train an evidence function according to the method of FIG. 1 by providing examples to extracting evidence supporting a provided claim from content. The evidence function may be learned by applying well known machine learning techniques, as described herein above in step 320 with respect to a claim function.

The first and second content may include, for example, textual content, image content, audio content, video content or a combination thereof. In some embodiments, the first and second content may be the same. In some embodiments, the first, second and third groups of people may be the same.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising using at least one hardware processor for:
   generating a claim training dataset comprising a first content item and multiple claims, each of the multiple claims being with respect to a topic of a plurality of topics, wherein the claims are selected from the first content item by a first group of people;
   generating a classification training dataset comprising a classification of each claim of the multiple claims as a pro or a con claim with respect to its corresponding topic, wherein the classification is performed by a second group of people;
   machine-learning a claim function for extracting claims from a provided content resource, with respect to a provided topic under consideration (TUC), wherein the machine-learning is based on the claim training dataset;
   machine-learning a classification function for classifying a provided claim with respect to a provided TUC, wherein the machine-learning is based on the classification training dataset;
   receiving a new TUC as a digital text;
   providing the new TUC as input to the claim function;
   applying the claim function to at least one content resource, to: (a) retrieve textual passages with respect to the new TUC, and (b) extract, from the textual passages, claims with respect to the new TUC, wherein the at least one content resource is accessible through a URL (Uniform Resource Locator) and contains unstructured text in digital format; and
   providing the new TUC as input to the classification function, and applying the classification function to one or more claims of the extracted claims, to output corresponding one or more classification tags, wherein:
      each classification tag is associated with its corresponding claim, and
      the applying of the classification function comprises classifying each of the one or more claims as a pro claim or a con claim with respect to the new TUC.

2. The method of claim 1, further comprising using said at least one hardware processor for providing a claim of the one or more claims as input to an evidence function, wherein the evidence function is configured to mine at least one content resource, and applying the evidence function to the content resource, to extract evidence supporting and associated with the claim.

3. The method of claim 2, wherein:
each of the extracted claims is associated with a claim score,
each of the outputted classification tags is associated with a classification score, and
each piece of evidence of the extracted evidence is associated with an evidence score,
and wherein the at least one hardware processor is further used for calculating a fused score for each of the one or more claims based on its associated claim score, classification score and evidence scores.

4. The method of claim 2, further comprising using said at least one hardware processor for generating a list of arguments comprising a plurality of arguments, wherein each argument of the plurality of arguments comprises:
i) one different claim of the one or more claims,
ii) evidence which is associated with the one different claim, and
iii) a classification tag of the classification tags associated with the one different claim.

5. The method of claim 4, further comprising using said at least one hardware processor for displaying the list of arguments.

6. The method of claim 5, wherein the displaying of the list of arguments further comprises ordering the list of arguments according to the fused scores of the one or more claims corresponding to the arguments.

7. The method of claim 3, further comprising using said at least one hardware processor for determining weights, wherein the determining of the weights comprises:
determining a claim weight for the claim scores,
determining an evidence weight for the evidence scores,
determining a classification weight for the classification scores, and
wherein the calculating of the fused score is further based on the determined weights.

8. The method of claim 4, further comprising using said at least one hardware processor for refining at least one argument of the plurality of arguments.

9. The method of claim 4, further comprising using said at least one hardware processor for phrasing at least one argument of the plurality of arguments.

10. A computer program product comprising a non-transitory computer-readable storage medium having program code embodied therewith, the program code executable by at least one hardware processor to:
generate a claim training dataset comprising a first content item and multiple claims, each of the multiple claims being with respect to a topic of a plurality of topics, wherein the claims are selected from the first content item by a first group of people;
generate a classification training dataset comprising a classification of each claim of the multiple claims as a pro or a con claim with respect to its corresponding topic, wherein the classification is performed by a second group of people;
machine-learn a claim function for extracting claims from a provided content resource, with respect to a provided topic under consideration (TUC), wherein the machine-learning is based on the claim training dataset;
machine-learn a classification function for classifying a provided claim with respect to a provided TUC, wherein the machine-learning is based on the classification training dataset;
receive a new TUC as a digital text;
provide the new TUC as input to the claim function;
applying the claim function to at least one content resource, to: (a) retrieve textual passages with respect to the new TUC, and (b) extract, from the textual passages, claims with respect to the new TUC, wherein the at least one content resource is accessible through a URL (Uniform Resource Locator) and contains unstructured text in digital format; and
provide the new TUC as input to the classification function, and apply the classification function to one or more claims of the extracted claims, to output corresponding one or more classification tags, wherein:
each classification tag is associated with its corresponding claim, and
the applying of the classification function comprises classifying each of the one or more claims as a pro claim or a con claim with respect to the new TUC.

11. The computer program product of claim 10, wherein the program code is executable by the at least one hardware processor further to provide a claim of the one or more claims as input to an evidence function, wherein the evidence function is configured to mine at least one content resource, and apply the evidence function to the content resource, to extract evidence supporting and associated with the claim.

12. The computer program product of claim 11, wherein:
each of the extracted claims is associated with a claim score,
each of the one or more claims is associated with a classification tag, and
each of the extracted piece of evidence is associated with an evidence score,
and wherein the program code is executable by the at least one hardware processor further to calculate a fused score for each of the one or more claims based on its associated claim score, classification score and evidence scores.

13. The computer program product of claim 11, wherein the program code is executable by the at least one hardware processor further to generate a list of arguments comprising a plurality of arguments, wherein each argument of the plurality of arguments comprises:
(i) one different claim of the one or more claims,
(ii) evidence which is associated with the one different claim, and
(iii) a classification tag of the classification tags associated with the one different claim.

14. The computer program product of claim 13, the program code is executable by the at least one hardware processor further to refine at least one argument of the plurality of arguments.

15. The computer program product of claim 13, wherein the program code is executable by the at least one hardware processor further to phrase at least one argument of the plurality of arguments.

* * * * *